Figure 9:
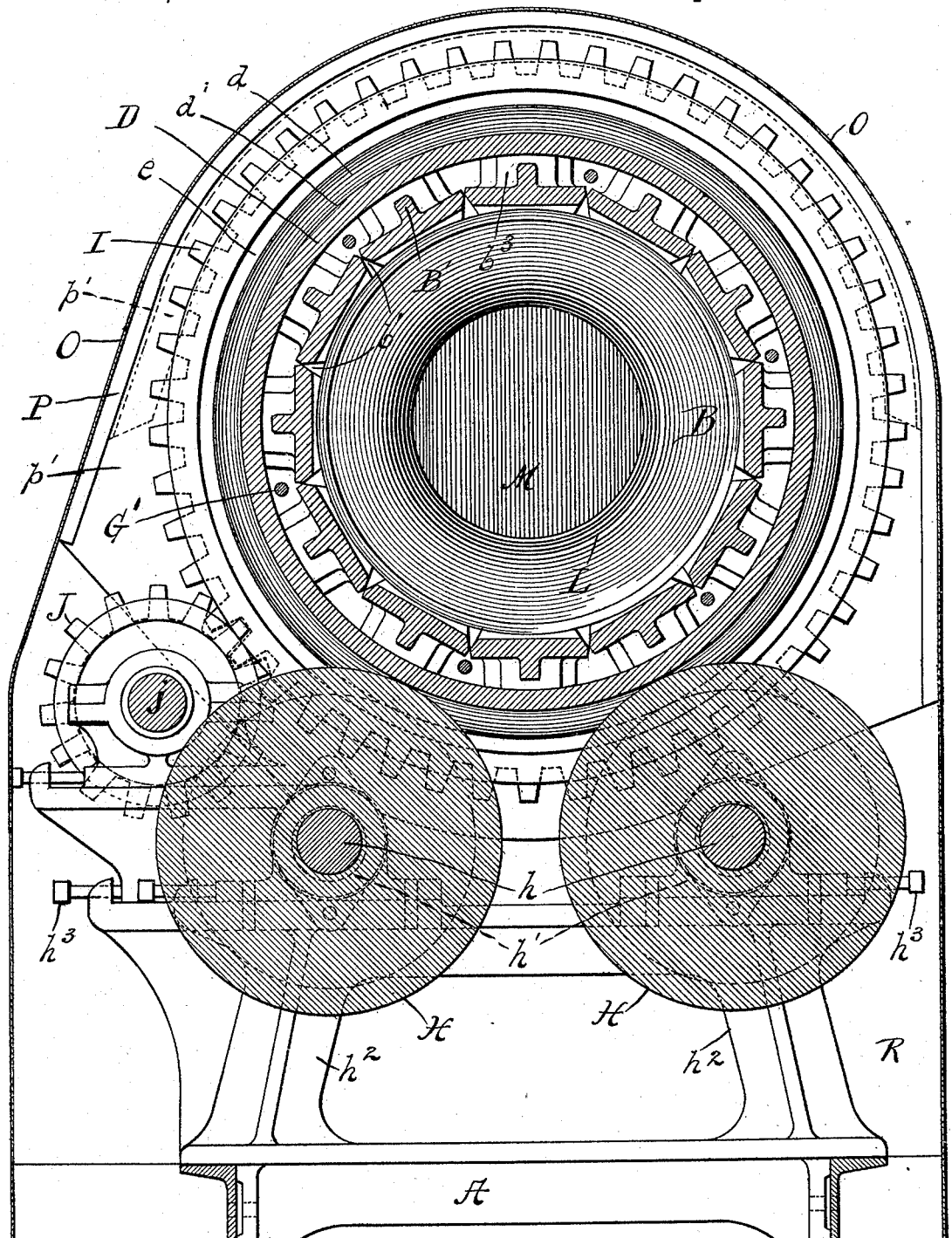

(No Model.) 5 Sheets—Sheet 1.
W. W. DOOLITTLE.
TUMBLER.
No. 518,735. Patented Apr. 24, 1894.
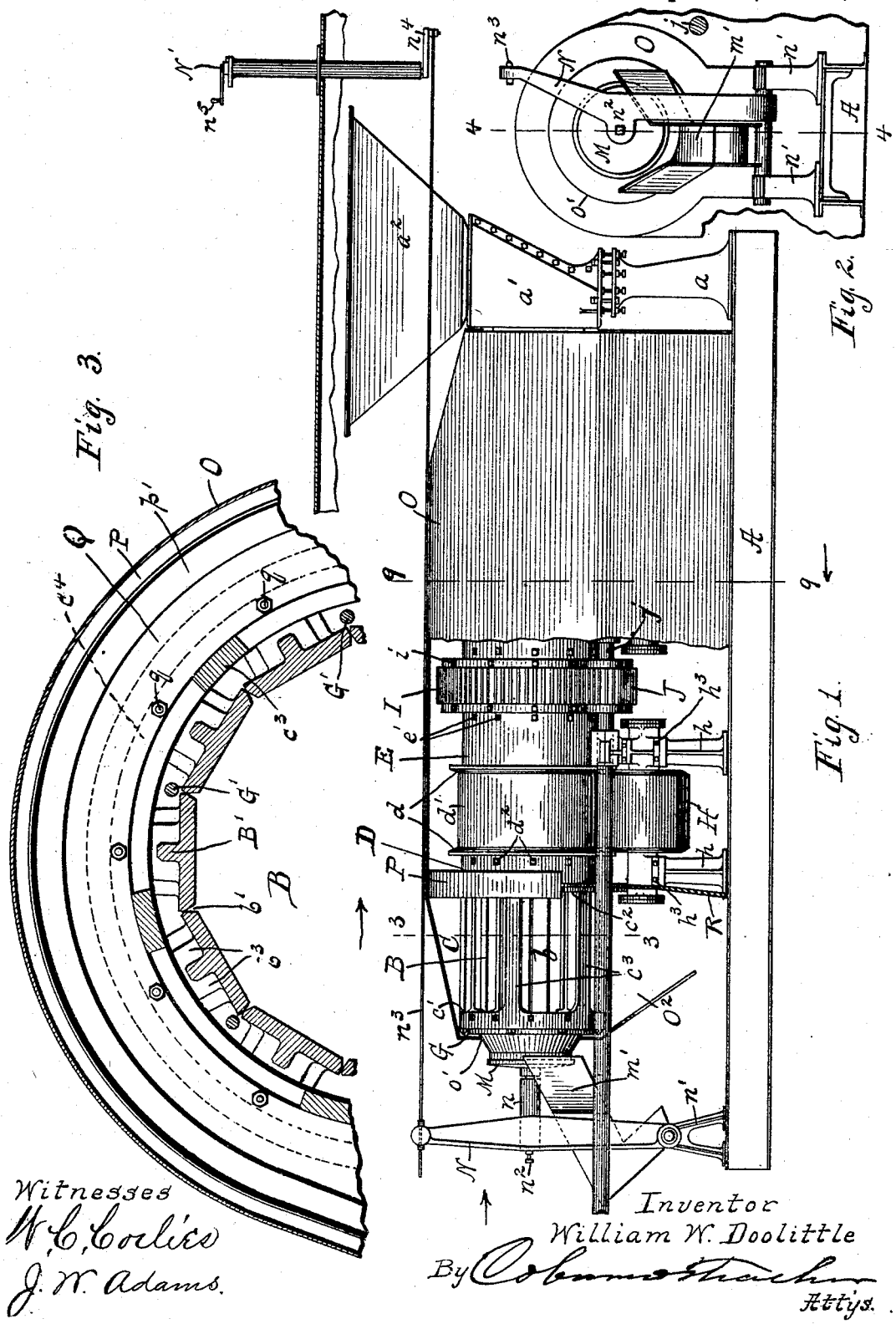
Witnesses
W. C. Coolics
J. W. Adams.
Inventor
William W. Doolittle
By [signature]
Attys.

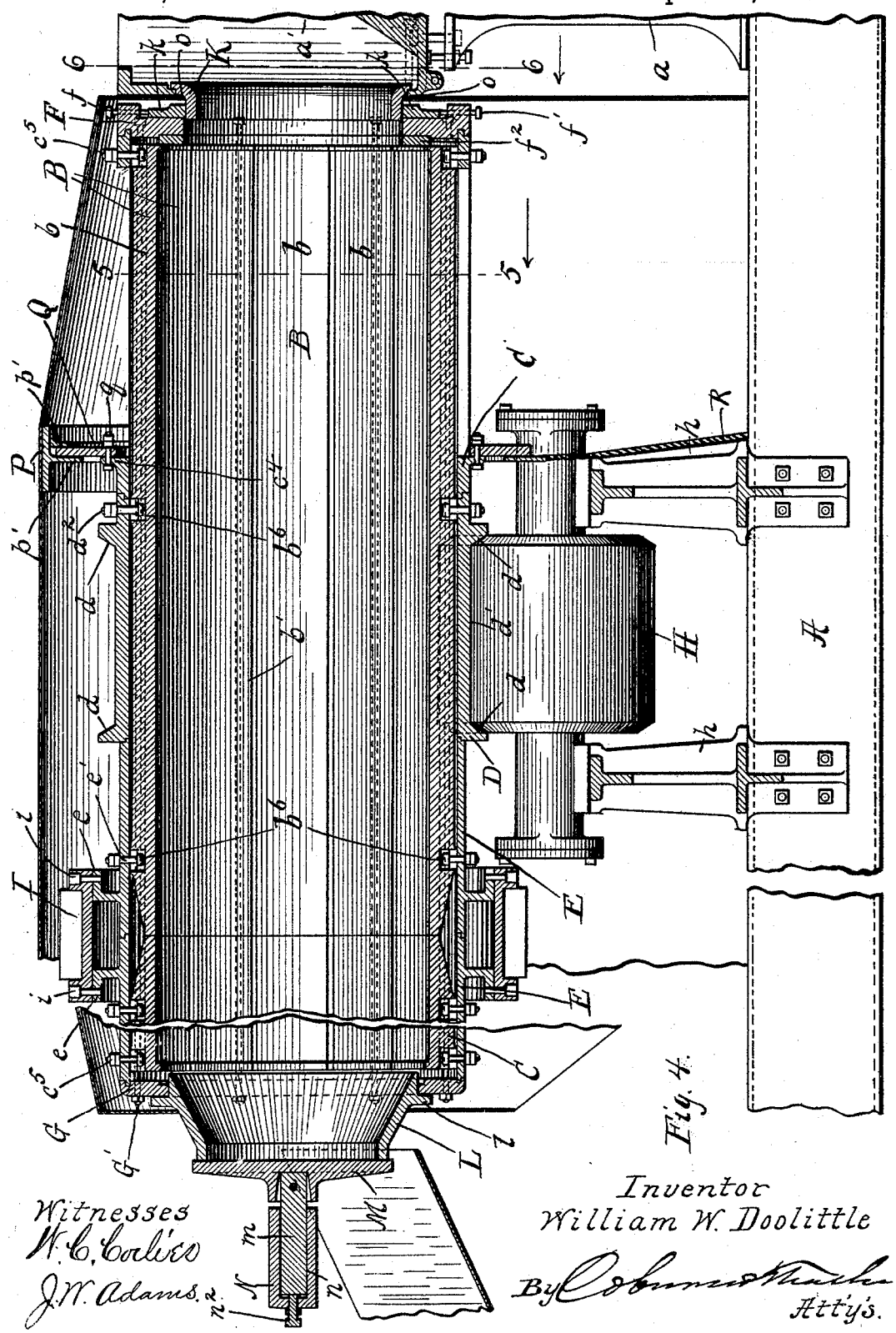

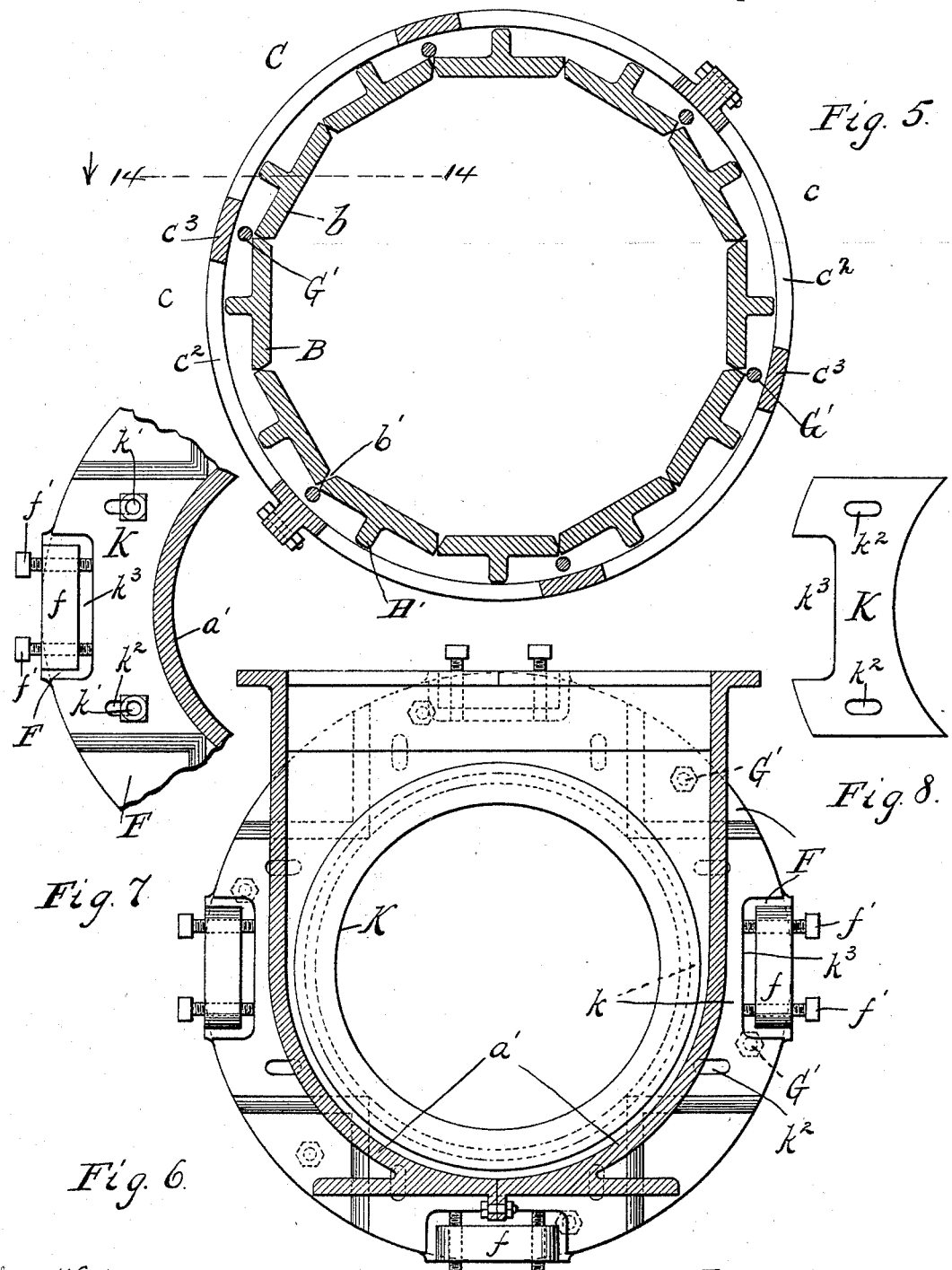

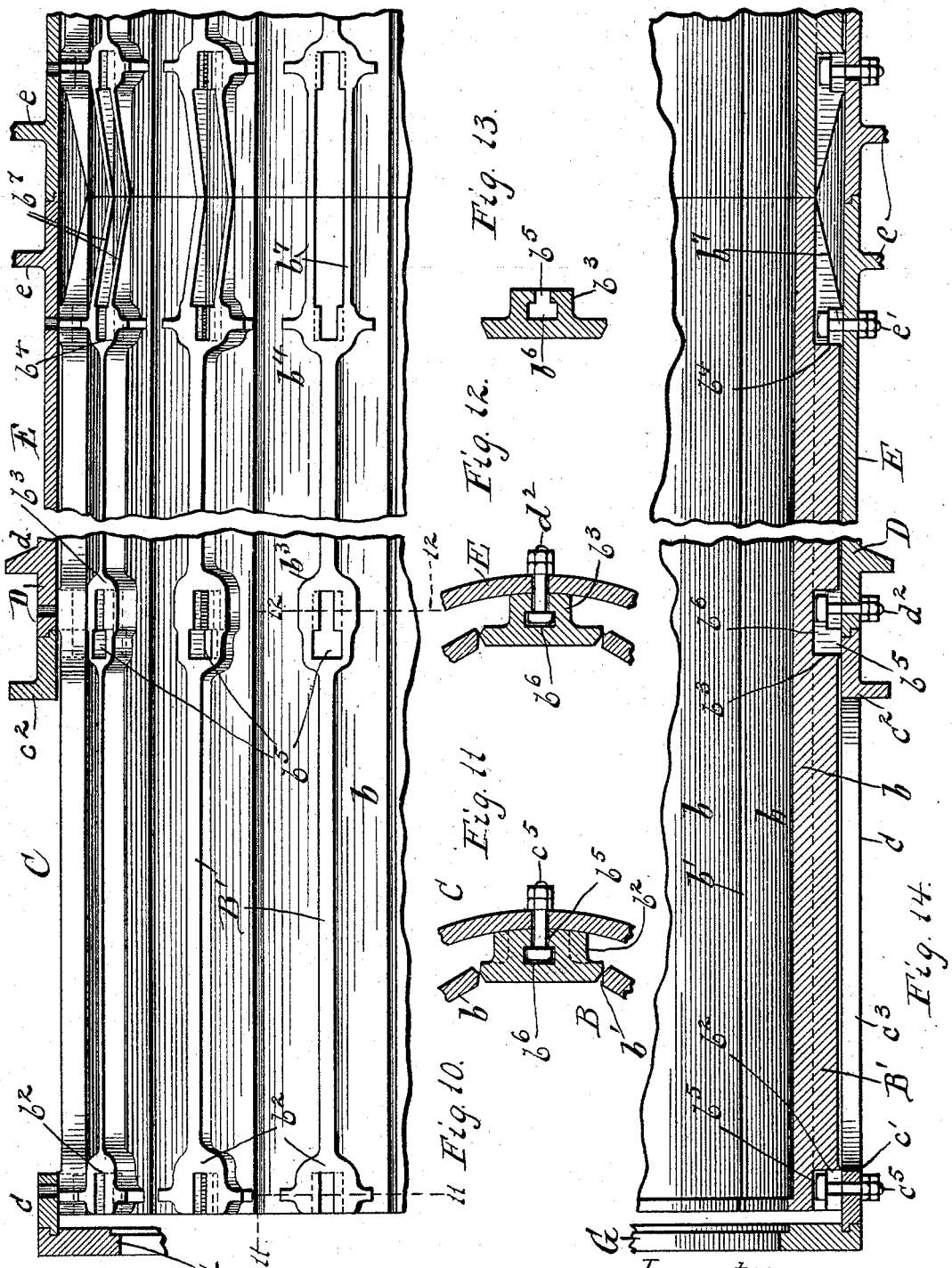

UNITED STATES PATENT OFFICE.

WILLIAM W. DOOLITTLE, OF CHICAGO, ILLINOIS, ASSIGNOR TO THE CRANE COMPANY, OF SAME PLACE.

TUMBLER.

SPECIFICATION forming part of Letters Patent No. 518,735, dated April 24, 1894.

Application filed March 10, 1892. Serial No. 424,449. (No model.)

*To all whom it may concern:*

Be it known that I, WILLIAM W. DOOLITTLE, a citizen of the United States, residing at Chicago, in the county of Cook and State of Illinois, have invented certain new and useful Improvements in Tumblers, which are fully set forth in the following specification, reference being had to the accompanying drawings, in which—

Figure 1, represents a side elevation of a tumbling machine embodying my invention, with the outer casing broken away; Fig. 2, an end elevation of the same looking in the direction of the arrow Fig. 1; Fig. 3, a detail section taken on the line 3—3 of Fig. 1; Fig. 4, a longitudinal section taken on the line 4—4 of Fig. 2, partly broken away; Fig. 5, a section taken on the line 5—5 of Fig. 4; Fig. 6, a similar section taken on the line 6—6 of Fig. 4; Fig. 7, a detail of Fig. 6; Fig. 8, an elevation of one of the ring fastening plates detached; Fig. 9, a cross section taken on the line 9—9 of Fig. 1; Fig. 10, a detail plan of the barrel as seen in Fig. 5 with the casing in section; Fig. 11, a detail section taken on the line 11—11 of Fig. 10; Fig. 12, a similar section taken on the line 12—12 of Fig. 10; Fig. 13, a similar section showing the stave only, and Fig. 14, a detail plan section taken on the line 14—14 of Fig. 5.

In the drawings, Figs. 1 and 2 are upon a single scale, the remaining figures are upon the same scale, but enlarged from the former, with the exception of Fig. 9, which is on a scale by itself somewhat more enlarged.

My invention relates to machines for cleaning castings and polishing articles of metal, known under the name of tumbler, tumbling box, rumble, or rolling barrel.

The invention consists in various improvements in different parts of the machine, and therefore I will describe in detail the construction and operation of a complete machine, in which I have carried out my invention in a practical way, and will then specify more definitely in claims the particular improvements which I believe to be new and wish to secure by Letters Patent.

In the drawings, A, represents the bed on which the machine is mounted; at one end, which may be called the front end, there is a standard $a$, on which is mounted a chute $a'$, which receives the castings or other articles from a hopper $a^2$, arranged above the chute and into which the articles are delivered. The revolving tumbler or rolling barrel is mounted horizontally as usual, and is arranged to receive the articles directly at the front of the chute, as will presently be described. This tumbler is of somewhat peculiar construction. It is composed of two parts or sections which are arranged in line with each other and are joined or secured together at their abutting ends. Each section is of substantially the same construction, so that a description of one in the main will answer for both. In the first place, there is an inner barrel B, which is composed of long slats or staves $b$, arranged with their edges touching, as seen in Figs. 5 and 9, thus forming a polygonal barrel. The edges of these slats are straight and perpendicular to the face for a short distance, and then are cut away to form bevels $b'$, running inward, so that the slats touch along sharp lines or narrow edges, leaving a little wedge shaped opening between the slats both outside and inside of this line contact, as seen in the figures above mentioned. This construction permits a slat to be removed from the inside without disturbing the outer barrel. It is only necessary to take out the bolts which connect any slat to the outer barrel and it may then be slipped inward between the two adjacent slats, as will be seen from an inspection of Fig. 5. If it were not for this construction, it would be necessary to take the outer barrel apart in order to remove a defective or broken slat of the inner barrel. On the outer face of each slat there is a rib B′, running the entire length thereof. Each rib has three enlargements in the direction of its width, one $b^2$, at the outer end of the barrel, the second $b^3$, about the middle thereof, and a third $b^4$, at the inner end. Each of these enlargements makes a kind of head, in which is cut a T slot or recess $b^5$, the wider portion of the recess being the inner portion next to the face of the slat or stave, this recess in the end enlargements is open at the outer end; in the middle head $b^3$, there is a square recess or opening $b^6$, made directly inward at one end of the T shaped slot, and of the same dimensions as the wider part of the latter. The ribs at their inner ends terminate in a fork running out from the head $b^4$ and cut away or beveled, as seen at $b^7$.

Outside of the inner barrel made by the staves as described, there is a second casing or barrel which is made up of three or more sections on each half of the tumbler. At the outer end of each part of the tumbler there is a section C, next within is a section D, and at the inner end a section E. These separate sections entirely surround the inner barrel, the staves of which are secured thereto as will presently be explained. The sections join each other by lap joints and the two inner ones abut against each other and are joined by a lap joint, as seen in Fig. 4. These several sections may be cast as entire rings, but preferably are made in two parts, each the half of a circle, joined to make a complete ring, as seen in Fig. 5, of the drawings, in which the outer section C, is shown formed from two half circles $c$. These outer sections or rings C, are of skeleton form, being composed of an outer ring $c'$, and an inner ring $c^2$, joined by bars or slats $c^3$, with wide spaces cut out between them, thus making a kind of skeleton cage at each end of the tumbler, as seen in Fig. 1 of the drawings, in which the cage at the rear end of the barrel is shown uncovered. The inner ring $c^2$, is also provided with a narrow vertical flange $c^4$, projecting directly outward from the ring. The middle section D, is a broad, plain band, with a circumferential flange $d$, at each edge, the inside of each flange being slightly beveled or inclined, as seen in Fig. 4, and a broad, smooth tread $d'$ being provided within these two flanges. The third or inner section E, is a plain band or ring, except that near the extreme edge thereof, it is provided with a circumferential flange $e$, of angle iron shape in cross section, one arm of the angle being perpendicular to the ring, and the other or outer one parallel thereto, as seen in Fig. 4. The staves which form the inner barrel are secured to these several bands or rings in the following manner: At their outer ends they are fastened to the outer rings $c'$, by means of bolts $c^5$, the heads of which are slipped into the T slots $b^5$, in the heads $b^2$ at this end of the staves and being passed out through holes in the rings $c'$ are secured by nuts on their outer ends, as seen in Figs. 4 and 11. In like manner the staves are secured to the middle ring D, by means of bolts $d^2$, the heads of which are fitted into the T slots $b^5$, in the middle heads $b^3$, of the staves, the square openings $b^6$ providing for this connection. The bolts being passed out through suitable apertures in the band D, are secured by nuts on their outer ends, as seen in Figs. 4 and 12; and in like manner the ends of the staves are secured to the inner rings E, by means of bolts $e'$, which are fitted in the T slots of the heads $b^4$, at the inner ends of the staves and are passed out thence through suitable apertures in the band E, and secured by nuts on the outside thereof, as seen in Figs. 4 and 14.

At each end of the barrel there is a wide, flat ring, which, being fitted and secured to the parts already mentioned at the respective ends of the barrel, fastens the whole together and completes the structure. At the front end this ring F, joins directly by a lap joint the outer ring of the cage; and at the rear end the ring G, joins in a similar way the outer ring of the cage section at that end of the barrel. Long rods $G'$ running the entire length of the barrel connect these two end rings by means of heads at one end and nuts at the other, as seen in Figs. 4 and 5. It will be seen from this description that the several parts which go to make up the completed barrel, are thus securely connected together and that, by means of the bolts joining the staves to the outer barrel and the long rods running the length of the latter, these fastenings may be tightened to any degree required, so as to make the completed structure a firm, solid barrel. This barrel is mounted on bearing rollers H, which are adapted to fit the bearing surfaces provided by the inclined flanges and midway tread on the central band D, of the two parts of the barrel. These rollers are arranged in pairs just below the barrel, as seen in Fig. 9, and are on long shafts or journals $h$, which are mounted in suitable journal bearings $h'$ on standards or suitable supports $h^2$, rising from the bed of the machine, as seen in Fig. 4. The journal bearings are constructed to slide on their supports and are adjustable thereon by means of set screws $h^3$, as seen in Fig. 9, for the purpose of adjusting the rollers properly to the tumbler.

To provide for the rotation of the tumbler an annular gear I, is fastened thereto midway of its length. This is accomplished by making this gearing to fit the angle iron flanges $e$, at the inner end of the inner section E of the outer drum, as seen in Fig. 4, and the gearing is secured thereto by means of bolts $i$, which pass through the flat outer sections of these flanges and flanges $i'$ projecting on each side of the teeth of the gearing, as seen in the same figure. A driving pinion J, on a drive shaft $j$, engages with this gear I, and thereby imparts the required rotary motion to the tumbler. A ring K, is fitted in the front opening of the chute $a'$, the edge of the ring by which this fitting is made being curved outward until it is nearly perpendicular to the diameter, and is then fitted to the chute opening by a lap joint, as seen in Fig. 4. The opposite end or edge of the ring just enters the opening of the ring F, and is fastened in this position by four plates $k$, which are set diametrically opposite each other and secured to the ring F, by means of bolts $k'$ passing through slots $k^2$, in the plates. The inner edge of these plates is concave to fit the ring K, the outer edge is cut out to form a recess $k^3$, into which projects a lug $f$ on the ring F, and in this are inserted set screws $f'$ whereby the said plates may be set up against the ring K, as may be required, the slots $k'$ permitting this movement, and the bolts passing through said slots serving also as a fastening to secure these plates in position. The ring K, must be of very hard metal, for obviously the castings will pass through this ring to enter the tumbler and consequently the wear thereon is very severe. A thin ring or gasket $f^2$ of similar very hard metal is also placed just inside the ring F, between the latter and the front ends of the staves, this ring is of a little less diameter than the inner barrel, and so projects inward a little beyond the staves and affords a protection against the wear of the latter by the castings running into the barrel. It will be seen that these pieces which take the wear are independent of the main parts of the barrel and may be easily replaced when finally worn out; they are comparatively inexpensive.

At the rear end of the barrel there is a discharge funnel L, the flaring edge of which is fitted nicely within the ring G, and is provided with an upright flange $l$, that abuts against the said ring, as seen in Fig. 4. The outer end of this discharge funnel is closed by a cap M, constructed to abut against the outer edge of the funnel. This cap is provided with a stem $m$, pivoted to the outer face thereof and this stem is supported by an upright swinging standard N, which is provided with a bearing $n$, suitable for this stem. The standard is pivoted at its lower end to a bracket $n'$ on the bed, and a set screw $n^2$ is inserted in the standard just back of the stem $m$, so as to provide for adjusting the latter to properly close the cap. The standard N, is connected at its upper end by a rod $n^3$ with any suitable lever or other device whereby the rod may be moved lengthwise to vibrate the standard to open and close the discharge funnel of the barrel. In the drawings this device is shown as an upright shaft N', provided with a crank arm $n^4$, to which the rod is connected, and a handle $n^5$, at its upper end by which it may be oscillated. A chute $m'$, is arranged just below the discharge funnel M, whereby the castings as they are delivered from the tumbler may be conducted away as desired.

Around the tumbler there is an outer casing O, of any suitable sheet metal. This casing is made large enough to leave some space between it and the barrel and to come down along the sides and ends of the latter to the bed, as seen in Figs. 1, 4 and 9. At the front end it is provided with an opening $o$, that receives the ring K, and at the rear end there is a similar opening $o'$ for the discharge funnel L. The top of this case is sloped downward slightly at each end, as seen in Fig. 1 and at the rear end below the funnel, it is bent inward to form an inclined section $o^2$, underneath the cage at this end of the tumbler, as seen in the same figure. This outer casing is supported and held in position by means of a band P, secured to the inside thereof, and provided on its inner face with two flanges $p'$ and $p'$ arranged a little distance apart. A flange ring Q, is fastened by bolts $q$, to the flange $c^4$, heretofore described, as provided on the inner ring of the skeleton cages. These flange rings and the band P are so arranged relatively that the ring will project into the space between the two flanges $p$ and $p'$, in which, however, they are free to turn with the tumbler. The outer casing is thus sustained and held against lateral and longitudinal movement. Within this outer casing there are also provided two cross-partitions, R, arranged below the barrel and fastened to the respective flange rings Q. These partitions extend down to the bed and prevent dust, falling through the skeleton cages at each end of the barrel, from passing inward to the gearing and bearings of the machine.

It will be understood, of course, that this tumbler is rotated, as usual, and that in its general operation it is like other machines of this kind. But there are some features of operation wherein this machine differs from any heretofore known to me. The barrel is of much greater length than usual—in fact, it is intended to be so long that as the castings travel along from the front to the rear end of the barrel they will be completely cleaned and may be discharged at once. It will be noted that the device for opening the discharge end of the barrel may be operated without stopping the rotation of the later. In operation then it is intended to deliver the castings to the barrel keeping the latter in rotation all the time until finally it is filled to the extent required from one end to the other. The castings which have reached the rear end at this time will be found clean and ready for discharge and without stopping the rotation of the barrel the discharge opening is uncovered and the delivery of clean castings will then commence at the rear end of the barrel. The discharge opening may be left uncovered and the operation of cleaning the castings is carried on constantly, the articles being delivered into the front end of the barrel and discharged clean at the rear end thereof without stopping the rotation of the barrel. The skeleton cages at each end of the barrel provide for the escape of dust and dirt from this part of the structure, so that the discharge thereof is also continuous and there can be no practical accumulation of dirt in the barrel. The second casing or outer barrel, surrounding the inner barrel between the skeleton ends thereof, protects the bearings of the barrel and the driving devices from all dirt which otherwise escaping through the slats might accumulate about these parts and soon interfere with their operation; and the outer casing and partitions R effectually protect this entire central portion of the machine from all dust and dirt which otherwise would there accumulate.

The construction is such as to provide a very substantial and satisfactory machine in which the operation may be continuous and at the same time one that is very readily repaired, because of the independent nature of the several parts which compose it, as set forth in the above description, from which it will also appear that these independent parts are readily detachable and removable and so may be replaced when damaged without destroying other parts of the machine. Modifications in construction and organization may be made, however, without losing the general features of my invention. For instance, a long barrel with an end discharge may be used without the double construction herein set forth and other departures may be made from the details herein set forth and still retain the main characteristics of my invention; hence I do not wish to be understood as limiting myself specifically to all the details of construction herein shown and described.

Having thus described my invention, what I claim as new, and desire to secure by Letters Patent, is—

1. In a tumbler, a complete interior barrel composed of independent slats or staves, in combination with a complete exterior cylinder or barrel surrounding the former, with a narrow space between the two, and devices whereby the slats of the interior barrel are each independently secured to the outer cylinder, substantially as described.

2. In a tumbler, an inner barrel B, composed of staves $b$, provided with T slots or recesses $b^5$, on their outer faces, in combination with an outer barrel surrounding the former, and bolts with their heads adapted to fit said T slots and passing through the outer barrel to secure the two together, substantially as described.

3. In a tumbler, an inner barrel B, composed of separate slats, in combination with an outer barrel surrounding the former and composed of the separate sections C, D, and E, abutting against each other, and through rods G', securing said sections together, substantially as described.

4. In a tumbler, an inner barrel B, in combination with an outer barrel section C of skeleton form, surrounding each end of the former, and entire middle sections D and E arranged between the end sections and detachably connected therewith, substantially as described.

5. In a tumbler, an inner barrel B, in combination with an incasing section D, connected to the former, and provided with a tread $d'$, having beveled flanges $d$ in combination with bearing rollers H, having beveled edges at the ends on which the tumbler is mounted and which are adapted to fit said flanged tread, substantially as described.

6. In a tumbler, an inner barrel B, in combination with outer casing sections E, connected thereto and provided with circumferential flanges $e$, and an annular gear I, seated on said flanges and secured thereto, substantially as described.

7. In a tumbler, an inner barrel B, composed of separate slats $b$, in combination with an outer barrel composed of the separate sections C, D, and E, connected respectively to the inner barrel, the end rings F, and G, applied to the respective ends of the barrel, and through rods G', extending from one end ring to the other, substantially as described.

8. In a tumbler, the end ring F, arranged at the front end of the barrel, in combination with a hard metal ring K, arranged in the former, and the sliding plates $k$, arranged to embrace the ring K, and adjustably attached to the ring F, substantially as described.

9. In a tumbler, the front end ring F, in combination with the hard metal delivery ring K, arranged therein, the sliding plates $k$, provided with concave inner edges, recesses $k^3$ at their outer edges, and slots $k^2$, the fastening bolts $k'$, for securing said plates to the ring F, and the set screws $f'$, in the ring F, adapted to adjust the plates $k$, substantially as described.

10. In a tumbler, an inner barrel B, in combination with the front end ring F, a hard metal delivery ring K, arranged within the former, and a hard metal gasket $f^2$, arranged between the ring F, and the end of the barrel B, to protect the latter from wear, substantially as described.

11. In a tumbler, an inner barrel B, in combination with an outer barrel surrounding the former and connected thereto, an end ring G, applied to the rear end of the latter, and a discharge funnel L, mounted in said ring, substantially as described.

12. In a tumbler, a discharge funnel L, mounted in the rear end of the barrel, in combination with a closing cap M, provided with a stem $m'$, an upright pivoted standard N, provided with a bearing in which said stem is mounted, and actuating devices whereby the attendant may swing said standard to open and close the funnel, substantially as described.

13. In a tumbler, an inner slatted barrel B, in combination with an outer barrel C, D, E, within which the former is mounted and to which it is secured, and an outer independent casing O, covering the whole barrel structure, substantially as described.

14. In a tumbler, an outer covering case O, in combination with bands P, secured on the inside thereof and provided with flanges $p'$, $p'$, the outer barrel sections C, provided with vertical flanges $c^4$, and a flange ring Q fastened to said flanges $c^4$ and entering loosely between the flanges $p'$ on the band P, substantially as described.

15. In a tumbler, a long continuous barrel provided with a skeleton cage section at each end thereof and having receiving and discharge openings in its opposite ends or heads, in combination with a delivery chute at the receiving end and devices for opening and closing the discharge opening at will, substantially as described.

WILLIAM W. DOOLITTLE.

Witnesses:
CARRIE FEIGEL,
A. M. BEST.